(12) United States Patent
Zilberberg

(10) Patent No.: US 7,671,538 B2
(45) Date of Patent: Mar. 2, 2010

(54) METHOD AND SYSTEM FOR ECONOMICAL EMERGENCY ACTIVATION OF ELECTRICAL DEVICES

(75) Inventor: Ofer Zilberberg, Tel Aviv (IL)

(73) Assignee: ODO Innovations Ltd., Tel Aviv (IL)

( * ) Notice: Subject to any disclaimer, the term of this patent is extended or adjusted under 35 U.S.C. 154(b) by 192 days.

(21) Appl. No.: 11/878,649

(22) Filed: Jul. 26, 2007

(65) Prior Publication Data
US 2009/0026962 A1 Jan. 29, 2009

(51) Int. Cl.
*H05B 37/00* (2006.01)
(52) U.S. Cl. .................. 315/86; 315/130; 315/131
(58) Field of Classification Search ............ 315/86, 315/159, DIG. 5; 340/321, 326, 332, 384.4, 340/431, 468, 471, 472, 473, 474, 475, 479, 340/539.3, 539.11, 573.1, 626, 628, 636.1, 340/636.15, 644, 690, 691.1, 693.1, 815.45, 340/902, 90
See application file for complete search history.

(56) References Cited

U.S. PATENT DOCUMENTS

| | | | |
|---|---|---|---|
| 4,977,351 A | 12/1990 | Bavaro et al. | |
| 4,985,661 A | 1/1991 | Lin | |
| 5,394,744 A | * | 3/1995 | James et al. ............. 73/114.02 |
| 5,416,384 A | | 5/1995 | Bavaro |
| 2008/0258628 A1 | * | 10/2008 | Higley et al. .................. 315/86 |

FOREIGN PATENT DOCUMENTS

| | | |
|---|---|---|
| DE | 103 04 594 | 8/2004 |
| GB | 2 380 541 | 4/2003 |
| GB | 2 401 262 | 11/2004 |
| JP | 08 317576 | 11/1996 |

OTHER PUBLICATIONS

International Search Report for International Application No. PCT/IL2008/000717 mailed Oct. 8, 2008.

* cited by examiner

*Primary Examiner*—Douglas W Owens
*Assistant Examiner*—Jae K Kim
(74) *Attorney, Agent, or Firm*—Pearl Cohen Zedek Latzer, LLP

(57) ABSTRACT

A method for activation of an electrical device, for example, in case of power loss. The method may include sensing an effect associated with activity of the electrical device, detecting an electrical power interruption, and activating the electrical device if a change in the effect of the device is sensed in proximity to the power interruption. The invention also provides an activation circuit for activation of an electrical device. The activation circuit may include a device operation detector for sensing an effect associated with activity of the electrical device, a power supply detector for detecting an electrical power interruption, and a driver for activating the electrical device if a change in operation of the device if the change is sensed in proximity to the power interruption.

31 Claims, 3 Drawing Sheets

METHOD AND SYSTEM FOR ECONOMICAL EMERGENCY ACTIVATION OF ELECTRICAL DEVICES

BACKGROUND OF THE INVENTION

Emergency lighting systems are usually installed in public buildings such as, for example, theaters, hospitals, schools and public shelters, in industrial buildings such as, for example, plants and warehouses and residence buildings, apartments and basements. Most of the known emergency lighting systems may activate the lighting whenever a power failure or interruption occurs.

A block diagram of a currently available emergency lighting system 100 is illustrated in FIG. 1. System 100 is powered by power source 112 and may include a light source 110, a, charger 116, battery 118, an electronic switching mechanism for example, SPDT relay 114, and relay switch 115. It is noted that the relay configuration is one of many options known in the art, and other or additional known electronic components may be used such as transistors, thyristors, silicon controlled resistors (SCR), triacs, and others. Under normal operation, charger 116 may charge battery 118 and the light may turn off. When a power failure occurs, relay coil 114 may be deactivated, relay switch 115 may connect light source 110 to battery 118 and the light may turn on. It will be noted that in the event that the battery voltage is not compatible with the lamp voltage, a voltage conversion may be is needed between battery 118 and lamp 110.

When the power failure ends, relay coil 114 may be activated, thus turning the light off and charger 116 may draw power from power source 112 to charge battery 118 back to fully charged state. Typically, the amount of power may be up to twice the power delivered to light source 110 due to the efficiency of charger 116 and the requirements of battery 118. This emergency lighting system may require two wires from the continuous power source to operate and may be mounted in addition to the light source (power operated bulb) controlled by the on/off switch mounted inside the room.

Some dual purpose emergency lighting systems may enable combining the regular room light source with the emergency light, in such way that they enable the light source to turn on according to the light switch, but activate the light source to work on batteries when there is a power failure. FIG. 2 illustrates a currently available dual purpose emergency lighting system 200. System 200 may include a power source 222, a light switch 220, a charger 224, a battery 226, a voltage converter 227, an electronic switch control mechanism 228, for example, a DPDT relay, a relay switch 225 and a light source 229. System 200 arrangement may require three wires connection and may need special installation preparation, and thus it cannot be simply connected to an existing bulb installation. When power source 222 is active, relay coil 228 may operate switch 225 to connect light source 229, for example, in series, to light switch 220, thus enabling light source 229 to work according to the position of switch 220. When power source 222 is not active, the relay coil 228 may be deactivated, thus connecting light source 229 to the output of voltage converter 227. Voltage converter 227 may be used to boost up the low voltage of battery 226, to match the type and specifications of light source 229. During a power failure battery 226 may be discharged by voltage converter 227 in order to power the light source 229. When the power failure ends, relay coil 228 may reconnect light source 229 to light switch 220 and charger 224 may start charging battery 226 to full capacity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
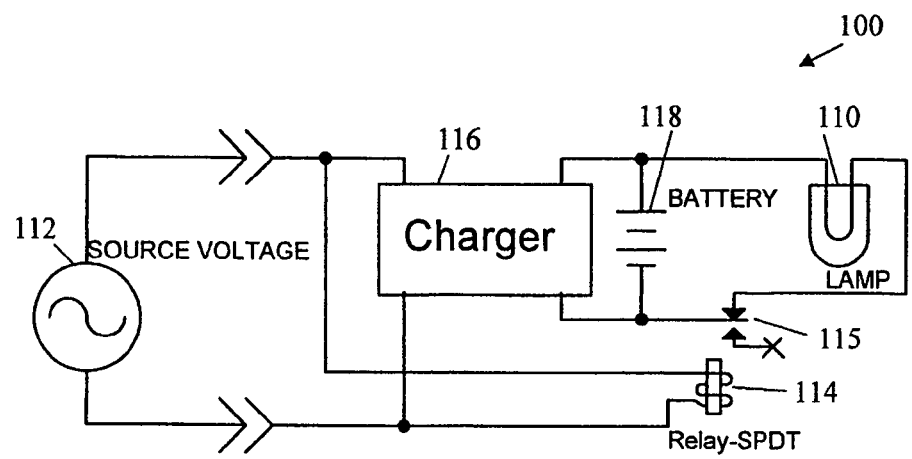
FIG. 1 is a block diagram illustration of a currently available emergency lighting system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
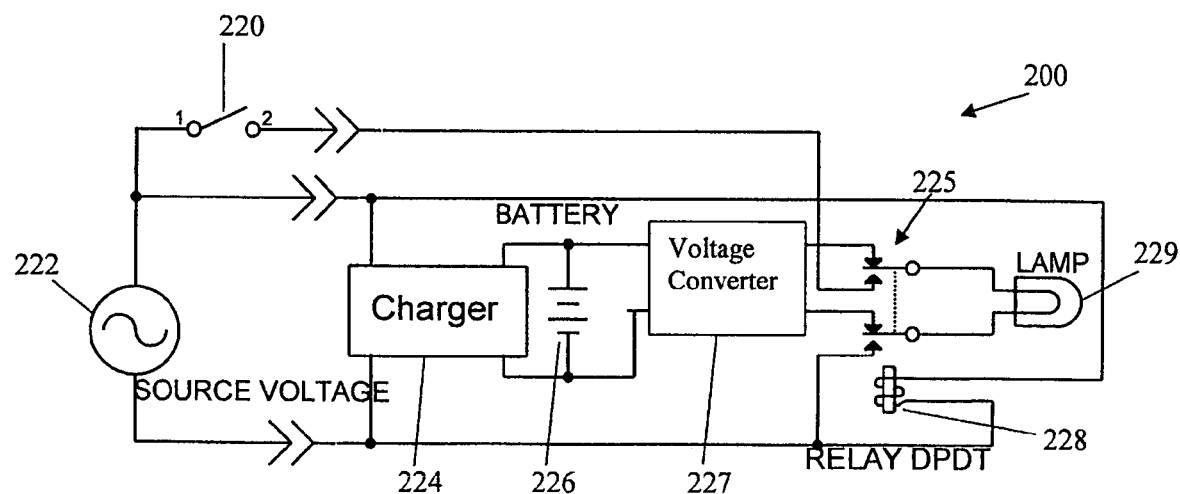
FIG. 2 is a block diagram illustration of a currently available dual purpose emergency lighting system.

The system described above with reference to FIGS. 1 and 2 may be activated also when it may not be needed, for example, when no one is in the room or when an alternative light source exists in the room, for example, daylight. These unnecessary activations of the lighting may involve waste of energy and money.

Additionally, the unnecessary activations of the lighting may reduce the life expectancy of the emergency lighting battery, lamp and/or other elements of the system. The actual life expectancy of the battery is mostly derived by the number of discharges. Many unnecessary discharges may result due to brownouts or blackouts (shutdowns) that occur during normal operation of the emergency lighting system. Since the light is turned on (and discharges the battery) in each event, ultimately it may result in a malfunction of the emergency lighting system, possibly after several months only. In emergency lighting applications, such as in shelters and warehouses, where the service is required rarely, the emergency light may malfunction as a result of numerous power events. This may prevent the emergency lighting system from operating when it may be mostly needed. Therefore, the operators of these facilities may have to maintain the emergency lighting systems by replacing them or checking them occasionally. This may incur costs including, for example, the replaced elements of the system, and the maintenance work.

Embodiments of the present invention may provide a method and system for economical emergency activation of electrical devices, for example, emergency lighting, radio, or other device which may be needed in case of electrical power interruption. The method and system of the present invention may enable energy saving and extension of the life expectancy of the components of the device, by reducing or even eliminating false activations of the system.

Figure 3:
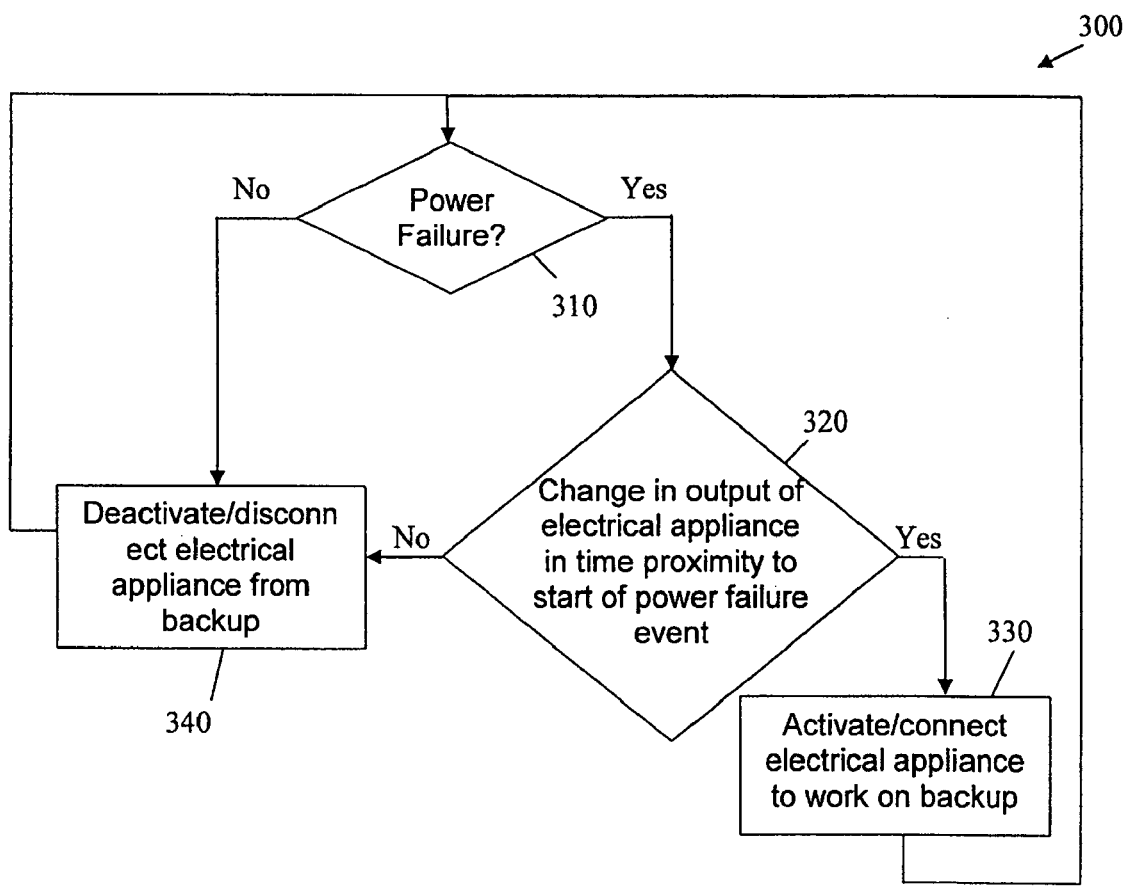
FIG. 3 is a flowchart illustrating a method for economical emergency activation of electrical devices, according to some embodiments of the invention.

Reference is now made to FIG. 3, which is a flowchart illustrating a method 300 for economical emergency activation of electrical devices according to some embodiments of the invention. The method may enable activation of the device during an electrical power interruption, only in case the device is needed during the electrical power interruption. The method may include detection of a power failure 310. This may be done, for example, by sampling and sensing the line voltage. Instantaneous or transient electrical power interruptions may be filtered out by, for example, decreasing the detection rate, for example, by using a time constant of an RC based circuit or a time constant set by a digital controller.

If a power failure is detected, the method detects whether a change has occurred in the output of the electrical appliance substantially contemporaneously with the power failure 320. For example, in case the device is a light source, a light sensor or detector may detect a sudden decrease in surrounding light substantially contemporaneously with the power failure or interruption. It will be recognized that in some methods according to embodiments of the invention, a change in output of the appliance may be considered substantially contemporaneously with a power failure if it occurs within a window of time before and after the detection of a power failure. The signal corresponding to the change in output of the appliance may last, for example, until after the actual decrease in the effect, for example, so that the voltage failure detection may occur during the change indication. The decrease signal may be extended, for example, by using a time constant of an RC based circuit or a time constant set by digital means, for example, digital controller, to define the time in which "synchronization" between the power failure and the event will be recognize as one needed to activate the emergency event. For example, a window may be 100 ms before or 500 ms after the power failure event. For example, in case of a filmant type light bulb it can take few seconds until the light completely shut down, in which case the time constant will be relatively large to enable operation of the backup only after the shut down. Other suitable time values are possible depending, for example on the time constant of the electrical appliance in response to a power interruption in order to increase the likelihood that a change in output is in fact correlated with a power failure and not, for example, deliberate manual switching off of the device prior to the power failure.

The method may include activation or connection to power of the device 330, for example, in case a change in output associated with the device is sensed at 320 within a period of time beginning a predetermined time before the electrical power interruption and lasting until a predetermined time after the beginning of the electrical power interruption. A predetermined threshold may determine a significant decrease in the light intensity, for example, according to the illumination requirements in a specific room. For example, a voltage signal with voltage magnitude proportional to the rapidity and to the magnitude of the decrease in the lighting effect may be produced, and may be compared to a predetermined threshold. Accordingly, if there was darkness before the power failure, e.g., the electrical light was off, or in case there is sufficient light in the room during the power failure, e.g. there is another light source in the room, the light detector may not detect a significant change in the light intensity, and the emergency lighting may be disabled or disconnected 340 and the electrical appliance will not be activated. Accordingly, methods according to embodiments of the invention reduce the unnecessary activation of emergency lighting. In some embodiments the method may be carried out in a digital implementation, for example by a microprocessor.

According to some embodiments of the present invention the method may enable economical emergency activation of electrical devices other than or in addition to light appliances. In case the device is a source of sound, for example, a radio, the activity detector may be, for example, a sound detector, and the device may be activated only if the detector detects significant decrease in the sound intensity.

Figure 4:
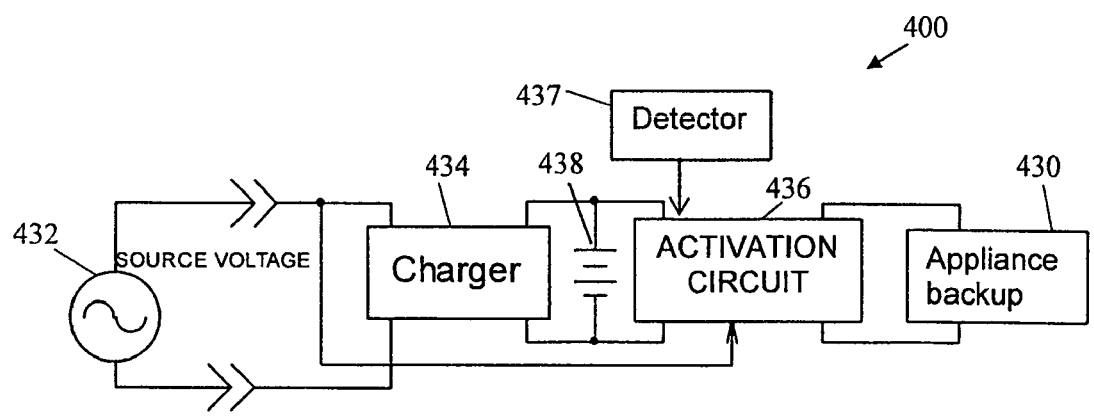
FIG. 4 is a schematic block illustration of a system for economical emergency activation of electrical devices according to some embodiments of the invention.

Reference is now made to FIG. 4, which is a schematic block illustration of a system 400 for economical emergency activation of electrical devices according to some embodiments of the invention, including an activation circuit 436 implementing a method described in FIG. 3. System 400 may include a power source 432, a charger 434, a battery 438, an activation circuit 436, a detector 437 and an appliance backup 430. Power source 432 may provide power both to charger 434 and to activation circuit 436. Power source 432 may provide power to system 400 as long as a power failure or interruption does not occur. As long as power is provided without interruption, activation circuit 436 may be configured not to activate appliance backup 430 regardless of the indications of detector 437. Activation circuit 436 may determine whether to activate appliance backup 430 according to the method described in FIG. 3. Thus, as shown schematically, activation circuit 436 may receive as inputs an indication from detector 437 and the line voltage 432. Upon the occurrence of predetermined conditions, for example, the detector detects a change within the detection window of the power failure, the activation circuit drives the appliance 430.

Figure 5:
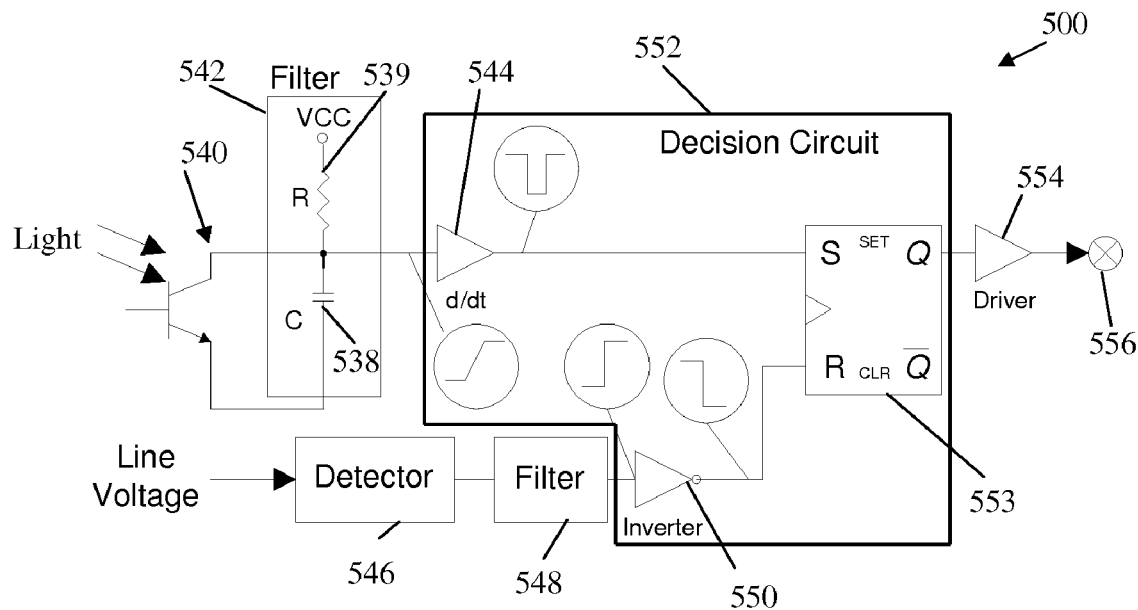
FIG. 5 is a schematic block illustration of an activation circuit according to some embodiments of the invention.

Reference is now made to FIG. 5, which is a schematic block illustration of an activation circuit 500 according to some embodiments of the invention. Activation circuit 500 may be included in system 400 for economical emergency activation of electrical devices. For activation of a light source, Activation circuit 500 may include a decision circuit 552 to receive as inputs functions of the light detector and the line voltage. In other embodiments of the present invention activation circuit 500 may be used for other appliances and may receive input from other kinds of detectors. For example, the electrical appliance may be a source of radio transmission and the detector may detect radio wave energy. In other example, the electrical device may be a source of mechanical force, such as a motor, and the detector may detect mechanical force.

In one embodiment, light detector 540, may include, for example, a photo transistor. Alternatively, light detector 540 may include a photo diode, a photo resistor, or any other kind of light-sensitive component. For activation of other devices, for example, a radio, system 500 may include, in addition to or instead of light detector 540, for example, a radio wave energy detector. Activation circuit 500 may also include a detector filter 542 to ensure that a change or decrease in the light is sufficiently large to trigger a change of output event. Detector filter 542 may be, for example, an RC-circuit including resistor 539 and capacitor 538. Detector filter 542 may have a relatively large time constant, for example, a time constant of 1 second, 2 seconds, 3 seconds, or greater than three seconds. When light detector 540 detects a decrease in the light intensity, detector filter 542 may output an extended decrease signal due to the relatively large time constant. Differentiator circuit 544 may produce a voltage level proportional to the rapidity and/or magnitude of the decrease. When the change is rapid and large enough, the voltage level produced may be grater then a certain threshold. The threshold may be predetermined according to, for example, a required accuracy and/or a required level of lighting. This may prevent false detections due to slow light changes, for example, changes due to the sunset.

In the embodiment shown in FIG. 5, the line voltage may be processed, for example, by a voltage detector 546, a voltage detector filter 548, an inverter circuit 550. Voltage detector 546 may include, for example, a half-wave rectifier for AC to DC conversion. Voltage detector filter 548 may filter transient power failures. Voltage detector filter 548 may have, for example, a small time constant, long enough to avoid false detections due to instantaneous power interruptions for example, power fluctuations which last up to approximately 1 second should not be considered as power failure. On the other hand, the time constant may be small enough to practically provide almost immediate detection of voltage failure which may be not transient and/or instantaneous. Inverter circuit 550 may operate decision circuit 552 according to the presence or absence of a voltage failure, for example, inverter circuit 50 may be an inverter which may produce a "1" or "0" logical signal, and thus, for example, operate decision circuit 52 according to the presence or absence of a voltage failure.

The outputs from the light detector and line voltage may be input to the decision circuit, for example, to a logic or memory element such as a flip-flop, as the set and reset inputs. The decision circuit may have as its output a logical low or high output, which may then be input a power driver 554 for driving the electrical appliance, such as light source 556. When a power failure is detected, e.g., when filter 542 produces a high output, activation circuit 500 may ascertain whether a change, for example, decrease, in the light intensity greater than a minimum threshold, was detected in sufficient temporal proximity with the power failure, and if so, to activate light source 56.

The time constant of detector filter 542 may be larger than the time constant of voltage detector filter 548, so that inverter circuit 550 may activate decision circuit 552 while the signal indicating the light change is outputted by differentiator circuit 544.

Figure 6:
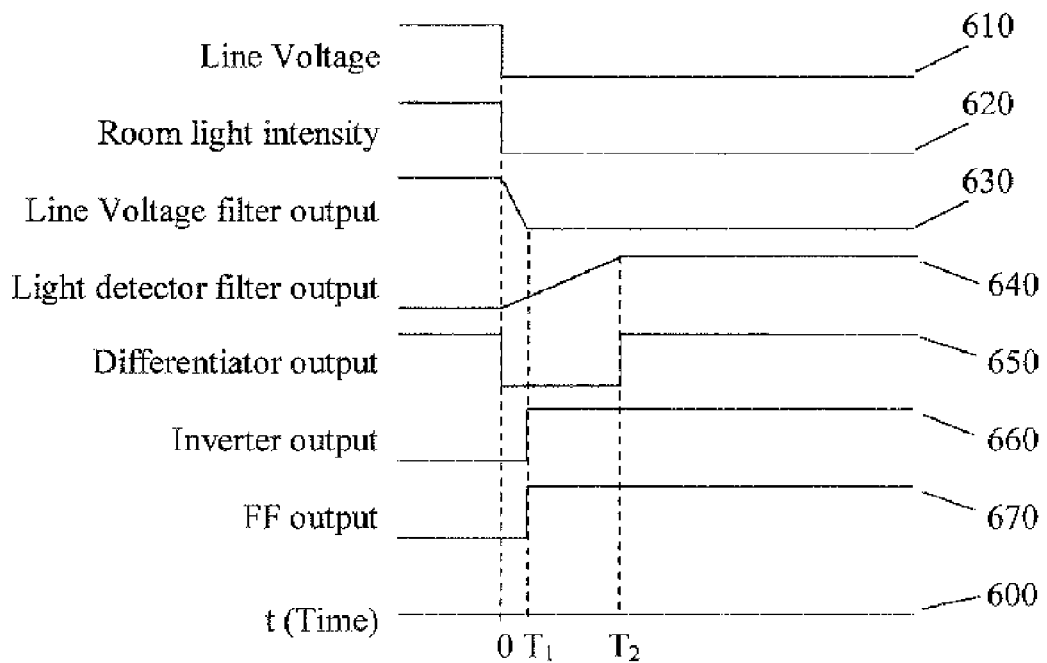
FIG. 6 includes schematic waveform diagram illustrations of changes along the time axis in outputs of several elements in a system for economical emergency activation of electrical devices according to some embodiments of the invention.

Reference is now made to FIG. 6, including schematic graph illustrations of changes along the time axis 600 in outputs of several elements in a system for economical emergency activation of electrical devices according to some embodiments of the invention. As illustrated in graphs 610 and 620, the line voltage and light intensity drop almost simultaneously at or near time t=0, for example, in case of power failure. Graph 630 illustrates the output of voltage detector filter 548 (shown in FIG. 5). Voltage detector filter 548 may have a small time constant, and therefore the voltage drop event may be slightly extended in time up to time $t=T_1$, enough to filter out transient voltage interruptions. This may prevent false detections of power failures. Graph 660 illustrates the output of inverter circuit 550 (shown in FIG. 5). Approximately at $t=T_1$, the output of inverter 550 may change its status to "1", and release the reset pin of the memory element 553, thus indicating a voltage failure to decision circuit 552. Graph 640 illustrates the output of detector filter 542 (shown in FIG. 5). Detector filter 542 may have a large time constant relative to the time constant of voltage detector filter 548. Therefore, the light change event may be extended in time up to time $t=T_2$ which may be larger than $T_1$. That is, the light change event in graph 640 may last until after the actual decrease in the light intensity, indicated in graph 620. Graph 650 illustrates the output of differentiator circuit 544 (shown in FIG. 5). Differentiator circuit 544 may produce a signal with duration from t=0 to $t=T_2$ and with magnitude proportional, for example, to the rapidity and/or magnitude of the change from light to darkness. When differentiator circuit 544 produces voltage level grater then a certain threshold, the "SET" pin of the memory element inside the decision circuit 552 may activate light source 556. In case $T_2$ is larger than $T_1$, a voltage failure may be indicated to decision circuit 552 while the signal is provided by differentiator circuit 544. Graph 670 illustrates the output of memory element 553 inside decision circuit 552 (shown in FIG. 5). When differentiator circuit 544 produces voltage level grater then a certain threshold, as soon as a voltage failure is indicated, e.g., approximately at time $t=T_1$, decision circuit 552 may force driver 554 to turn on light source 556 (shown in FIG. 5).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for activation of an electrical device, the method comprising:
    sensing a first level of an ambient condition proximate to the electrical device;
    detecting an interruption in electrical power supplying the electrical device after sensing said first level of the ambient condition;
    sensing a second level of the ambient condition proximate to the electrical device after the electrical power interruption; and
    activating the electrical device only if the difference between the first level and the second level indicate a change in operation of the electrical device and if the change in operation of the electrical device occurred substantially contemporaneously with the electrical power interruption.

2. A method according to claim 1, wherein said activating further comprises activating the electrical device if the interruption is longer then a predetermined duration.

3. A method according to claim 2, further comprising decreasing a rate of sensing of interruption in electrical power.

4. A method according to claim 3, wherein said decreasing is by a RC based circuit.

5. A method according to claim 3, wherein said decreasing is by a digital controller.

6. A method according to claim 1, wherein activating the electrical device further comprises activating the electrical device if said change in operation exceeds a predetermined threshold of at least one parameter selected from rapidity and magnitude based on the difference between the first sensed level and the second sensed level of said ambient condition.

7. A method according to claim 6, further comprising producing a signal with magnitude proportional to at least one of the rapidity and the magnitude of the change in said operation based on the difference between the first sensed level and the second sensed level of said ambient condition, wherein said activating of said electrical device comprises activating said electrical device only if said signal magnitude exceeds a predetermined threshold.

8. A method according to claim 1, further comprising producing an indication signal indicating the change in said operation, wherein said indication signal lasts for a predetermined time after the change in said operation occurs.

9. A method according to claim 8, wherein duration of the signal is produced using a RC based circuit.

10. A method according to claim 8, wherein duration of the signal is produced using a digital controller.

11. A method according to claim 1, wherein said electrical device is a light source and said sensed ambient condition is light proximate to said light source.

12. A method according to claim 1, wherein said electrical device is a source of sound and said sensed ambient condition is sound proximate to said sound source.

13. A method according to claim 1, wherein said electrical device is a source of radio transmission and said sensed ambient condition is radio wave energy proximate to said radio transmission source.

14. A method according to claim 1, wherein said electrical device is a source of mechanical force and said sensed ambient condition is production of mechanical force.

15. An activation circuit for activation of an electrical device, the activation circuit comprising:
an ambient condition detector for sensing a level of an ambient condition proximate to said electrical device;
a power supply detector for detecting an interruption in electrical power supplying the electrical device; and
a driver for activating the electrical device only if said ambient condition detector senses a change in level of the ambient condition between a first and a second detected level and said change in level of the ambient condition occurs substantially contemporaneously with detection of electrical power interruption by the power supply detector.

16. An activation circuit according to claim 15, wherein said activation circuit receives power from a power source when said power source is active, and from a battery at least when said power source is not active.

17. An activation circuit according to claim 16, wherein said battery is adapted to be charged by a charger receiving power from said power source.

18. An activation circuit according to claim 15, further comprising a decision circuit for forcing said driver to activate the electrical device only if said ambient condition detector senses said change in level of the ambient condition and said change in level occurs substantially contemporaneously with detection of electrical power interruption by the power supply detector.

19. An activation circuit according to claim 18, wherein said decision circuit is for forcing said driver to activate the electrical device if the detected electrical power interruption is longer then a predetermined duration.

20. An activation circuit according to claim 19, further comprising a filter for decreasing the detection rate of said power supply detector.

21. An activation circuit according to claim 20, wherein said filter includes an RC-based circuit.

22. An activation circuit according to claim 20, wherein said decision circuit includes a digital controller.

23. An activation circuit according to claim 18, wherein said decision circuit is further for forcing said driver to activate the electrical device only if said change in level of ambient condition is maintained in excess of a predetermined threshold of at least one of rapidity and magnitude of said change in level of the ambient condition.

24. An activation circuit according to claim 23, further comprising a differentiator circuit for producing a signal with magnitude proportional to at least one of the rapidity and the magnitude of the change of said level of the ambient condition, wherein said decision circuit is for forcing activation of said electrical device in case said signal magnitude exceeds a predetermined threshold.

25. An activation circuit according to claim 15, further comprising a filter for producing an indication signal indicating the change of said level of the ambient condition, wherein said indication signal lasts for a predetermined time after the change in said level occurs.

26. An activation circuit according to claim 25, wherein said filter provides duration of the signal by a RC based circuit.

27. An activation circuit according to claim 25, wherein said filter provides duration of the signal by a digital controller.

28. An activation circuit according to claim 15, wherein said electrical device is a light source and said ambient condition detector is a light detector.

29. An activation circuit according to claim 15, wherein said electrical device is a source of sound and said ambient condition detector is a sound detector.

30. A method according to claim 15, wherein said electrical device is a source of radio transmission and said ambient condition detector is for detecting radio wave energy.

31. A method according to claim 15, wherein said electrical device is a source of mechanical force and said ambient condition detector is for detecting mechanical force.

* * * * *